BALL & NAUMAN.
Seed-Dropper.
No. 30,114.
Patented Sept. 25, 1860.
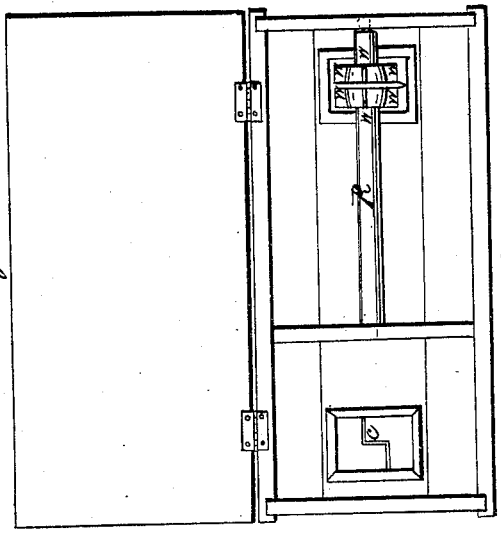
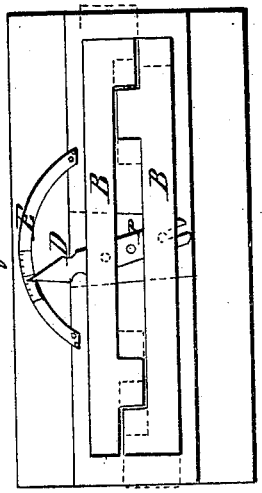
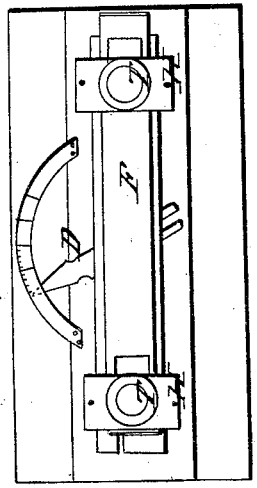
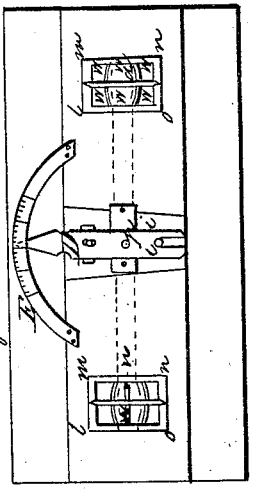
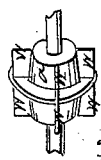

UNITED STATES PATENT OFFICE.

G. S. BALL AND WM. H. NAUMAN, OF DAYTON, OHIO.

IMPROVEMENT IN SEED-DRILLS.

Specification forming part of Letters Patent No. 30,114, dated September 25, 1860.

*To all whom it may concern:*

Be it known that we, GEORGE S. BALL and and WILLIAM H. NAUMAN, of Dayton, in the county of Montgomery, in the State of Ohio, have invented certain new and useful Improvements in Seed-Drills; and we do hereby declare that the following is a full and exact description thereof, reference being had to the accompanying drawings, and to the letters of reference marked thereon.

Figure 1 is a plan showing the bottom side of the drill with the slides all on and the openings closed. Fig. 2 is also a plan, showing the bottom with the slides off. Fig. 3 shows the inside arrangement. Fig. 4 shows the regulating-slides.

In Fig. 1 the slide F is shown drawn out, so as to close the openings through which the seed passes. T T are tubes cast on the clamps H H.

In Fig. 2, D is the indicator, one end of which moves over the graduated arc E, and is attached to the slides by pins, which work in the slots *i i*. As this moves over the arc at one end the slides are moved to the right and left and the openings for the seed increased or diminished, the point of the indicator D showing the amount of seed escaping at any time. Through the openings *l m n o* is shown the feeders *a a*, being wheels with flanges in the center and wings *w w* on either side, the flange in each working directly over the center of the opening in the slides.

In Fig. 3 the inside of the drill is shown with the feeder *a* working on a roller, R. The slides, slightly opened, are seen at C. In Fig. 4 the slides are more plainly shown. When open they are in the position shown by the dotted lines.

What we claim as our invention, and desire to secure by Letters Patent, is—

The arrangement and combination of the feeder *a*, the indicator D, graduated arc E, slides B B, and cut-off F, the whole constructed and operating as set forth.

GEO. S. BALL.
WM. H. NAUMAN.

Witnesses:
JAMES TURNER,
M. P. NOLAN.